United States Patent [19]

Natarajan

[11] Patent Number: 5,212,806
[45] Date of Patent: May 18, 1993

[54] DISTRIBUTED CONTROL METHODS FOR MANAGEMENT OF MIGRATING DATA STATIONS IN A WIRELESS COMMUNICATIONS NETWORK

[75] Inventor: Kadathur S. Natarajan, Millwood, N.Y.

[73] Assignee: International Business Machines Corporation, Armonk, N.Y.

[21] Appl. No.: 605,723

[22] Filed: Oct. 29, 1990

[51] Int. Cl.⁵ .............................................. H04B 7/26
[52] U.S. Cl. .................................. 455/33.2; 455/33.4; 455/56.1; 379/60
[58] Field of Search ..................... 455/33.4, 33.2, 54.1, 455/54.2, 56.1; 379/59, 60

[56] References Cited

U.S. PATENT DOCUMENTS

| | | |
|---|---|---|
| 4,402,090 | 8/1983 | Gfeller et al. |
| 4,456,793 | 6/1984 | Baker et al. |
| 4,597,105 | 6/1986 | Freeburg |
| 4,628,152 | 12/1986 | Akerberg ............................ 455/34.2 |
| 4,639,914 | 1/1987 | Winters |
| 4,665,519 | 5/1987 | Kirchner et al. |
| 4,730,310 | 3/1988 | Acampora et al. |
| 4,777,633 | 10/1988 | Fletcher et al. |
| 4,792,946 | 12/1988 | Mayo |
| 4,807,222 | 2/1989 | Amitay |
| 4,837,858 | 6/1989 | Ablay et al. |
| 4,852,122 | 7/1989 | Nelson et al. |
| 4,881,271 | 11/1989 | Yamauchi et al. ..................... 379/59 |
| 4,926,495 | 5/1990 | Comroe et al. |
| 4,947,452 | 8/1990 | Hattori et al. ........................ 455/54.2 |
| 4,955,082 | 9/1990 | Hattori et al. ........................ 455/54.2 |
| 5,029,183 | 7/1991 | Tymes |

FOREIGN PATENT DOCUMENTS

| | | |
|---|---|---|
| 0328100 | 8/1916 | European Pat. Off. |
| 0102129 | 3/1984 | European Pat. Off. |
| 0324509 | 7/1989 | European Pat. Off. |
| 2659569 | 5/1978 | Fed. Rep. of Germany ..... 455/33.4 |
| 1562963 | 3/1980 | United Kingdom |

OTHER PUBLICATIONS

"Algorithms Improve Cellular Trafffice Handling", by O. Avellanedaz Telesis vol. 13, No. 4, 1986, Ottawa, CA pp. 33-39.
IBM Technical Disclosure Bulletin, vol. 24, No. 7, Jan. 1982 entitled "Infrared Micro-broadcasting Network for In-House Data Communication" by F. Gfeller.
IBM Technical Disclosure Bulletin, vol. 20, No. 7, Dec. 1977, entitled "Wireless Connection Between a Controller and a Plurality of Terminals" by F. Closs et al.

*Primary Examiner*—Reinhard J. Eisenzopf
*Assistant Examiner*—Nguyen Vo
*Attorney, Agent, or Firm*—Perman & Green

[57] ABSTRACT

In a wireless communications network having a plurality of header stations (12) in bidirectional wireless communication with one or more mobile communication units (10), a method of managing ownership of the mobile units. In accordance with the method the following steps are executed. A first step receives, with a mobile communication unit located at a position (44) that is served by two or more of the header stations, a transmission from each of the header stations. The received transmissions are received over the wireless communications network and each uniquely identify the transmitting header station. The method further includes a step of selecting, with the mobile communication unit, one of the header stations as a header station to manage future wireless communications for the mobile communications unit. A further step is performed if the selected header station is not a header station that is presently managing wireless communications for the mobile communications unit. This further step transmits a message over the wireless network from the mobile communications unit to the selected header station requesting that the mobile communications unit be assigned to the selected header station.

23 Claims, 5 Drawing Sheets

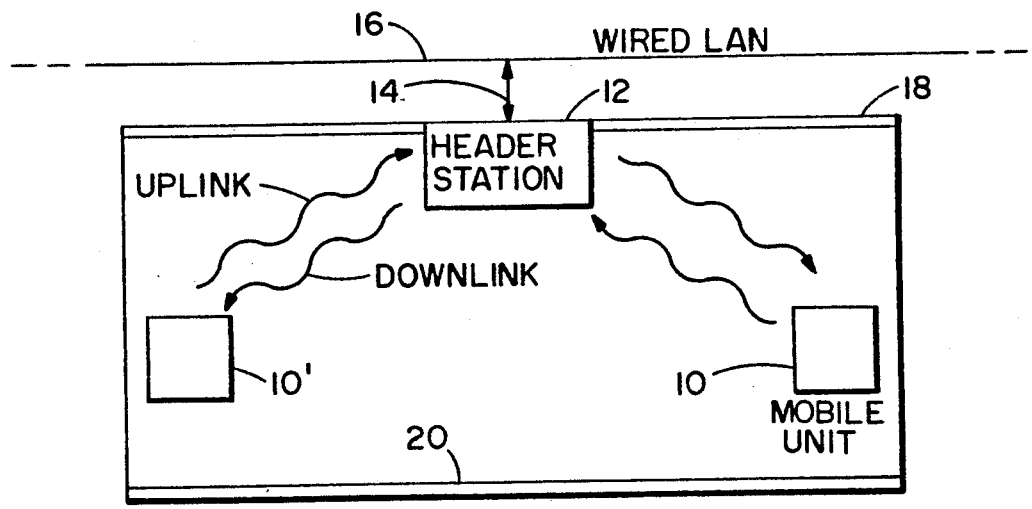
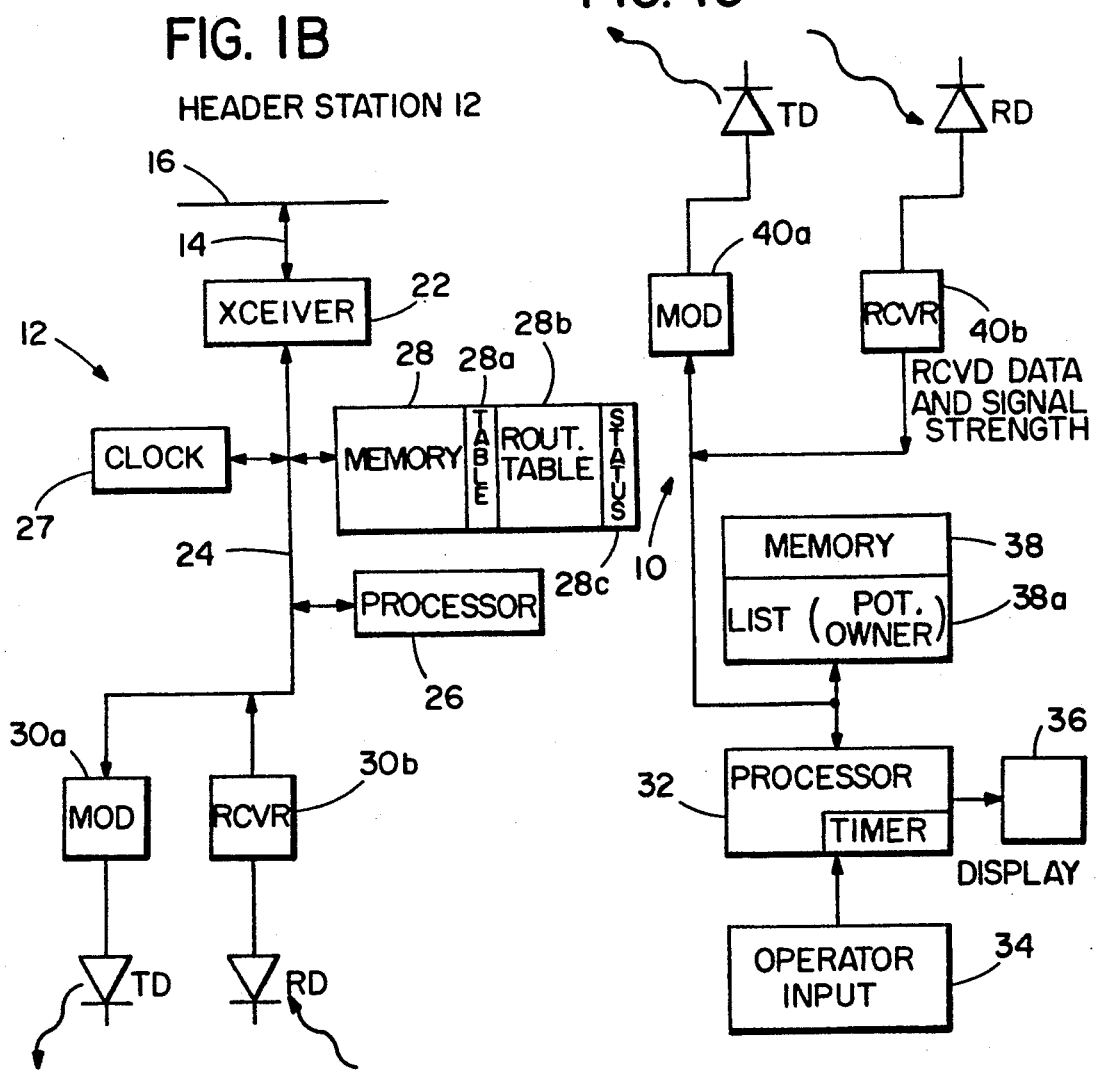

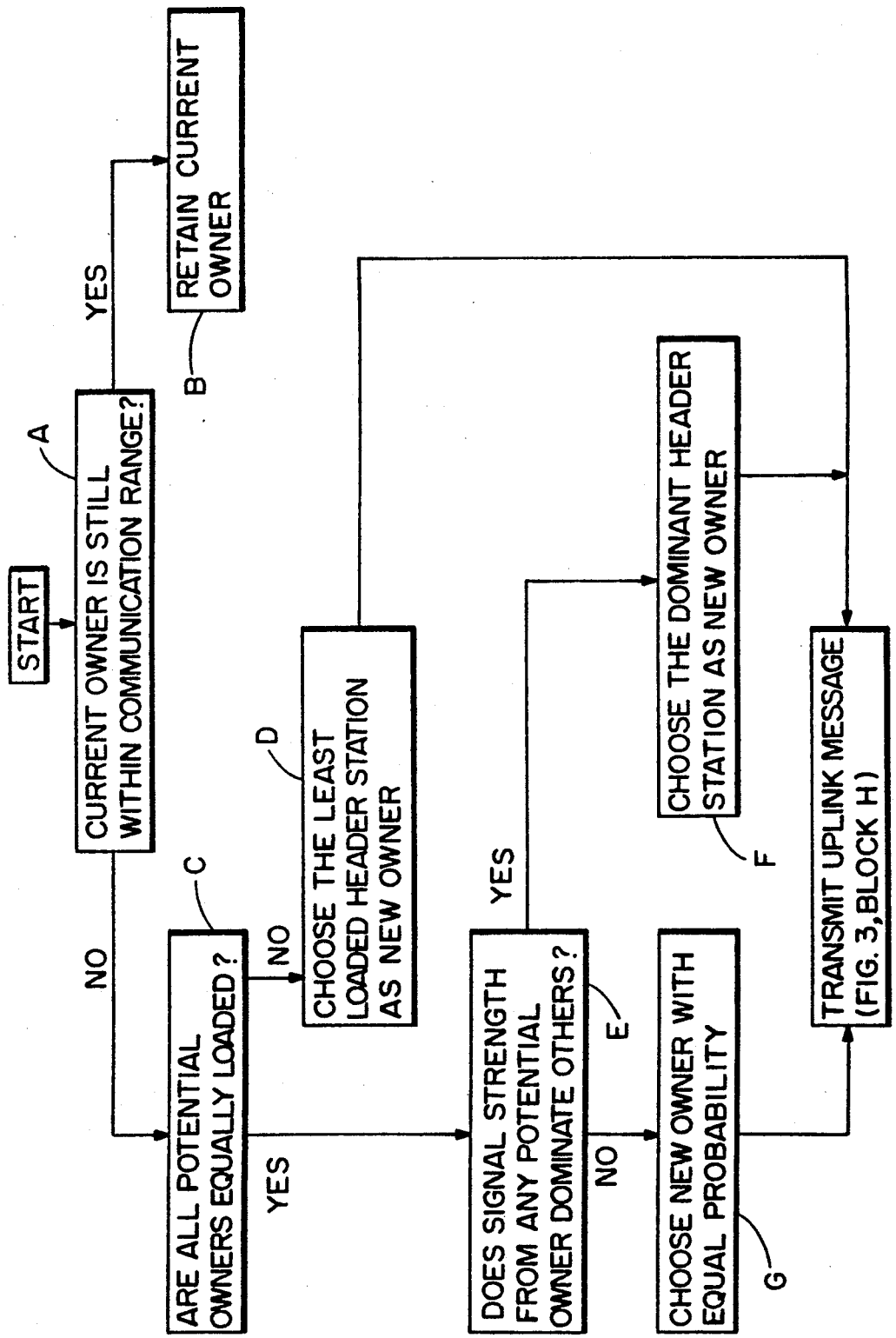

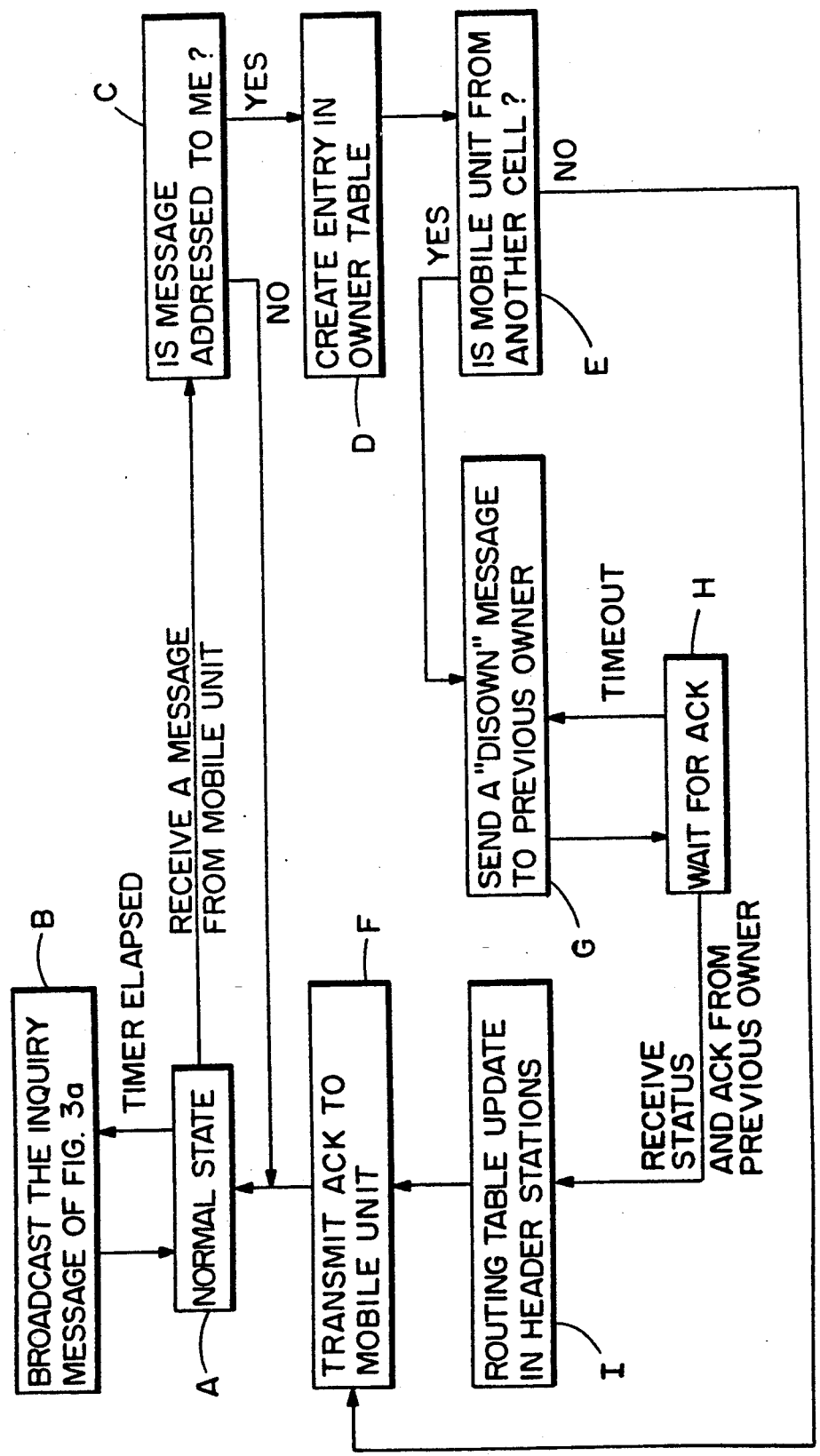

DISTRIBUTED CONTROL METHODS FOR MANAGEMENT OF MIGRATING DATA STATIONS IN A WIRELESS COMMUNICATIONS NETWORK

FIELD OF THE INVENTION

This invention relates generally to communication methods and, in particular, to a method of managing domain and ownership relationships of mobile communication units in a wireless network having fixed header stations with overlapping communication cells.

BACKGROUND OF THE INVENTION

In a local area network (LAN) environment a user, such as a portable computer equipped with communication capability, gains access to the LAN via a physical connection in order to communicate with remote facilities or use shared resources, such as file servers, print servers, etc. In a stationary mode of operation, all users are static and each user gains access to the network via a fixed homing point. However, in a mobile environment users are free to change their physical location and cannot be restricted to gain access to the network only through one of several homing points attached to the LAN. In a mobile environment the homing points are fixed header stations that communicate with the mobile units through a wireless link. Examples of wireless links include radio frequency (RF) links, microwave links and infrared (IR) links.

For example, a wireless network may include two Header Stations ($HS_1$ and $HS_2$) attached to a wired network. Each header station has an associated wireless communication coverage area, or cell. All communication traffic originating from or destined for a first mobile data processing unit is managed by $HS_1$, also considered to be the "owner" of the first mobile data processing unit. Similarly, all communication traffic originating from or destined for a second mobile data processing unit is managed by $HS_2$, the owner of the second mobile data processing unit. As a user moves from one physical location to another, the header station responsible for managing the communication needs of the user must also change. Management of the communications needs of a mobile unit includes routing messages from the mobile unit to the LAN and broadcasting messages from the LAN to the mobile unit.

As a mobile unit moves from cell to cell, the mobile unit's owner is required to change. The type of mobile communication of interest herein implies that mobile units communicate with one another, via a header station or stations, using symbolic names and without any specific reference to a physical location at which the mobile unit may presently be positioned. As such, a number of suitable communication protocols are required to manage the change in ownership of a given mobile unit as it changes position relative to the fixed header stations. These protocols include the following.

(a) Establishment of unique ownership for each mobile unit that become active, or turned on, for the first time in the system.

(b) Detection of movement of mobile units as they cross from one communication cell to another.

(c) Accomplishing the change of ownership of mobile units as movement from one cell to another occurs.

(d) The assignment of a unique owner to a mobile unit positioned in an area of overlap between two header stations and wherein the mobile unit could potentially be serviced by either of the header stations.

(e) Readjustment of routing related information at header stations that are affected by the movement of a mobile unit.

An underlying concern in implementing these protocols is a consideration that mobile units are battery powered and that any implementation of the protocols must seek to conserve battery power. In this regard it is typically the case that an uplink transmission, from the mobile unit to the header station, places significantly more demand on battery power than the reception of a downlink transmission from the header station to the mobile unit. Thus, a protocol that minimizes the number of uplink transmissions is preferable to one that may require many uplink transmissions for accomplishing the same function.

The following U.S. Patents and articles are made of record for teaching various aspects of mobile communication.

The following two U.S. Patents show communication systems having overlapping coverage areas. U.S. Pat. No. 4,597,105, Jun. 24, 1986, entitled "Data Communications System having Overlapping Receiver coverage Zones" to Freeburg and U.S. Pat. No. 4,881,271, issued Nov. 14, 1989, entitled "Portable Wireless Communication Systems" to Yamauchi et al. Yamauchi et al. provide for a hand-off of a subscriber station from one header station to another by the header station continually monitoring the signal strength of the subscriber station.

The following U.S. patents teach various aspects of wireless communication networks.

In U.S. Pat. No. 4,792,946, issued Dec. 20, 1988, entitled "Wireless Local Area Network for Use in Neighborhoods" S. Mayo describes a local area network that includes transceiver stations serially coupled together in a loop.

In U.S. Pat. No. 4,777,633, issued Oct. 11, 1988, entitled "Base Station for Wireless Digital Telephone System" Fletcher et al. describe a base station that communicates with subscriber stations by employing a slotted communications protocol.

In U.S. Pat. No. 4,730,310, issued Mar. 8, 1988, entitled "Terrestrial Communications System" Acampora et al. describe a communications system that employs spot beams, TDMA and frequency reuse to provide communication between a header station and remote stations.

In U.S. Pat. No. 4,655,519, issued May 12, 1987, entitled "Wireless Computer Modem" Kirchner et al. disclose a wireless modem for transferring data in a computer local area network.

In U.S. Pat. No. 4,639,914, issued Jan. 27, 1987, entitled "Wireless PBX/LAN System with Optimum Combining" Winters discloses a wireless LAN system that employs adaptive signal processing to dynamically reassign a user from one channel to another.

In U.S. Pat. No. 4,837,858, issued Jun. 6, 1989, entitled "Subscriber Unit for a Trunked Voice/Data Communication System" Ablay et al. disclose a trunked voice/data subscriber that operates in either a voice mode or one of three data modes.

In U.S. Pat. No. 4,852,122, issued Jul. 25, 1989, entitled "Modem Suited for Wireless Communication Channel Use" Nelson et al. disclose a wireless communication system and, specifically, a modem that communicates digital data with data terminal equipment.

In U.S. Pat. No. 4,926,495, issued May 15, 1990 entitled "Computer Aided Dispatch System" Comroe et al. disclose a computer aided dispatch system that includes a master file node and a plurality of user nodes The master file node maintains a record for each subscriber and automatically transmits an updated record to each dispatcher attached to a subgroup in which the subscriber operates.

In U.S. Pat. No. 4,456,793, issued Jun. 26, 1984, W. E. Baker et al. describe a cordless telephone system having infrared wireless links between handsets and transponders. The transponders are wired to subsystem controllers which are in turn wired to a system controller. The central controller polls the cordless stations every 100 milliseconds to detect cordless station locations and to identify "missing" cordless stations.

In U.S. Pat. No. 4,807,222, issued Feb. 21, 1989 N. Amitay describes a LAN wherein users communicate with RF or IR signals with an assigned Regional Bus Interface Unit (RBIU). Protocols such as CSMA/CD and slotted ALOHA are employed in communicating with the RBIUs.

In commonly assigned U.S. Pat. No. 4,402,090, issued Aug. 30, 1983, F. Gfeller et al. describe an infrared communication system that operates between a plurality of satellite stations and a plurality of terminal stations. A host computer communicates with the terminal stations via a cluster controller and the satellite stations, which may be ceiling mounted. Communication with the terminal stations is not interrupted even during movement of the terminal stations.

In IBM Technical Disclosure Bulletin, Vol. 20, No. 7, December 1977 F. Closs et al. describe the use of both line-of-sight and diffuse transmission of infrared signals for wireless communications between a ceiling-based controller and a plurality of terminals.

In IBM Technical Disclosure Bulletin, Vol. 24, No. 8, page 4043, January 1982 F. Gfeller describes general control principles of an infrared wireless network incorporating multiple ceiling mounted transponders that couple a host/controller to multiple terminal stations. Access to the uplink channel is controlled by a Carrier Sense Multiple Access/Collision Detection (CSMA/CD) method.

What is not taught by this prior art, and what is thus an object of the invention to provide, are communication methodologies that realize, in a wireless communications network, the protocols (a)-(e) described above.

A further object of the invention is to accomplish the above referenced protocols (a)-(e) in a manner that makes efficient use of battery power of mobile units in a wireless communications network.

SUMMARY OF THE INVENTION

The foregoing and other problems are overcome and the objects of the invention are realized by a method for managing ownership of one or more mobile communication units within a wireless communications network. The wireless communications network has a plurality of header stations in bidirectional wireless communication with one or more mobile communication units. In accordance with the method the following steps are executed. A first step receives, with a mobile communication unit located at a position that is served by two or more of the header stations, a transmission from each of the header stations. The received transmissions are received over the wireless communications network and each uniquely identify the transmitting header station. The method further includes a step of selecting, with the mobile communication unit, one of the header stations as a header station to manage future wireless communications for the mobile unit. A further step is performed if the selected header station is not a header station that is presently managing wireless communications for the mobile unit This further step transmits a message over the wireless network from the mobile unit to the selected header station requesting that the mobile unit be assigned to the selected header station.

The step of selecting includes the steps of (a) determining if a received transmission originated from a header station that is presently managing wireless communications for the mobile unit; and, if so (b) determining if a strength of the received transmission is above a predetermined threshold; and if so (c) retaining the header station that is presently managing wireless communications for the mobile unit.

If the header station that is presently managing communications for the mobile unit is not retained the step of selecting further includes the steps of (d) determining a number of other mobile units that are currently managed by the header stations that serve the position occupied by the mobile unit; and (e) selecting the header station that is managing the fewest number of other mobile units. If all of the header stations that serve the position occupied by the mobile unit are determined to be managing a same number of other mobile units the method includes a further step of (f) selecting the header station having a signal strength that exceeds the signal strengths of the other header stations by a predetermined amount. If none of the header stations that serve the position occupied by the mobile unit are determined to have a signal strength that exceeds that of the other header stations by the predetermined amount, the method includes a further step of (g) selecting one of the header stations at random.

BRIEF DESCRIPTION OF THE DRAWING

The above set forth and other features of the invention are made more apparent in the ensuing Detailed Description of the Invention when read in conjunction with the attached Drawing, wherein:

FIG. 1a is a block diagram showing a plurality of mobile units communicating with a header station;

FIG. 1b is a block diagram of the header station of FIG. 1a;

FIG. 1c is a block diagram of the mobile unit of FIG. 1a;

FIG. 4b shows the format of a message transmitted from a mobile unit to specific header station having a domain that the mobile unit has determined that it will become a member of;

FIG. 5 is a flow chart illustrating a method performed by the mobile unit in determining a new header station having a domain to which the mobile unit is to become associated;

FIG. 6 is a flow chart illustrating a method performed by the header station in adding a mobile unit to its associated domain.

DETAILED DESCRIPTION OF THE INVENTION

Figure 2:
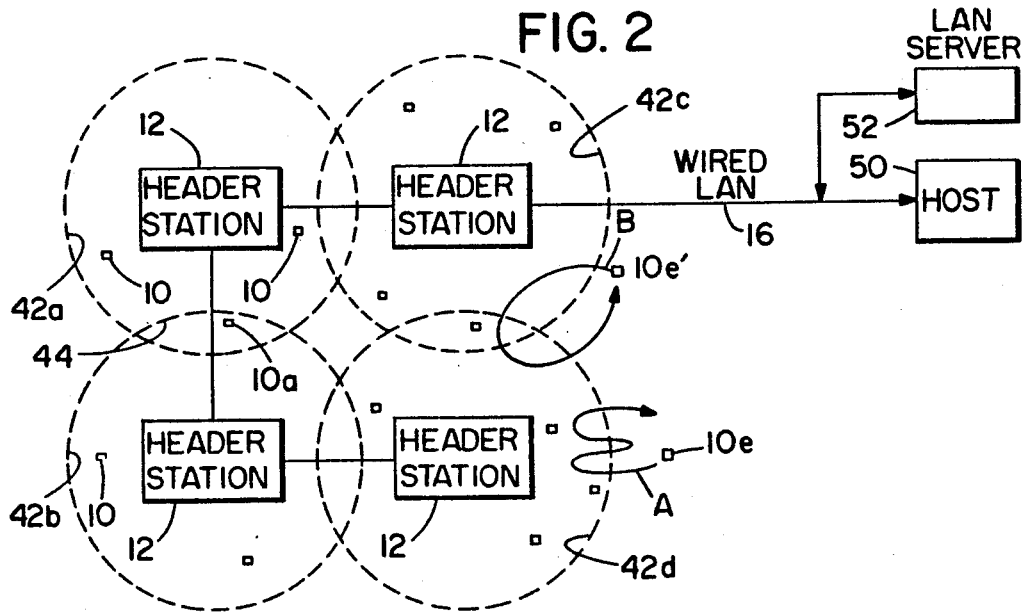
FIG. 2 shows a plurality of overlapping header station communication cells.

FIG. 1a depicts an embodiment of the invention wherein a mobile data station 10 is in bidirectional communication over an optical radiation communications channel with a network adapter, also referred to herein as a header station 12. The header station 12 is coupled via a connector 14 to a wired local area network (LAN) 16. As shown the header station 12 is disposed within or adjacent to a ceiling 18 and the mobile unit 10 is carried or is otherwise transported over a floor 20. Of course, the mobile unit 10 may be used in a stationary manner if desired.

The communications channel is carried via an infrared (IR) data link. Presently available optical devices readily provide for operation within the range of approximately 750 nanometers to approximately 1000 nanometers.

Referring to FIG. 1b there is shown a simplified block diagram of the header station 12. The header station 12 is coupled to the LAN 16 via the connector 14. Connector 14 is coupled to a network adapter transceiver 22 which in turn is coupled to an internal bus 24. The header station 12 includes a processor 26 that is bidirectionally coupled to a memory 28 that stores program-related and other data, including packets of data transmitted to or received from the mobile units 10. Also bidirectionally coupled to the processor 26 is a time keeping unit, or clock 27, the use of which is described below. Processor 26 also communicates with IR modulators and receivers; specifically a modulator 30a and a receiver 30b. The IR modulator and receiver have inputs coupled to suitable infrared emitting or receiving devices such as laser diodes, LEDs and photodetectors. In the illustrated embodiment the modulator 30a has an output coupled to a transmit diode (TD) and the receiver 30b has an input coupled to a receive photodiode (RD).

Referring now to FIG. 1c there is shown in block diagram form an embodiment of the mobile unit 10. Mobile unit 10 includes a processor 32 coupled to an operator input device 34 and also coupled to an operator display device 36. Operator input device 34 may be a keyboard or any suitable data entry means. Similarly, operator display device 36 may be a flat panel alphanumeric display or any suitable display means. Also coupled to processor 32 is a memory 38 that stores program-related data and other data, such as packets of information received from or intended to be transmitted to the header station 12 and also an identification of the mobile unit 10. Also coupled to processor 32 are a modulator 40a and a receiver 40b. The data receivers of FIGS. 1b and 1c include demodulators and filters and operate in a conventional manner to extract the modulated bit stream from the received optical signals. Similarly, the modulators of FIGS. 1b and 1c operate in a conventional manner to modulate the optical output in accordance with a transmitted bit stream. The processor 32 is also enabled to determine a signal strength of signals received by the receiver 40b.

A preferred data transmission rate is in the range of approximately one to ten million bits per second (1–10 Mbits/sec) although any suitable data transmission rate may be employed.

The wired LAN 16 may follow any suitable media access protocol that is contention free Examples include token ring networks and FDDI LANs. One suitable higher level network protocol is TCP/IP, described in detail in "Internetworking with TCP/IP Principles, Protocols, and Architectures" by Douglas E. Comer, Prentice Hall, N.J., 1988.

FIG. 2 illustrates a plurality of the header stations 12 each of which is coupled to a wired LAN 16 which in turn is coupled to a host data processing system 50. Other devices, such as a LAN server 52, may also be coupled to the LAN 16. The header stations 12 are disposed such that substantially symmetrical optical fields (42a14 42d) associated with each are overlapping. It can be seen that certain of the plurality of mobile units 10 are contained wholly within a single one of the fields, or cells, 42 while the mobile unit 10a is disposed within an overlapping region 44 between the cells 42a and 42b. During use, the mobile units 10 can be expected to move about within a given region and to travel, or migrate, from one cell 42 to another. This is depicted by the mobile units 10e and 10e'. Mobile unit 10e can be seen to enter the cell 42d along the path A and to subsequently exit, reenter and again exit the cell 42d. The mobile unit 10e, can be seen to follow the path B and to enter the cell 42c, pass through an overlap region, pass into the cell 42d and subsequently exit the coverage region altogether.

In the optical communication system of the invention all wireless communication is between the header station 12 and the mobile units 10. There is no direct communication between the mobile units 10. A random access protocol such as CSMA or a polling method (demand assigned TDMA) is the preferred method for transmission in the uplink direction. Downlink transmissions to the mobile units 10 are made in a broadcast mode. There is now considered a case where there are N header stations ($H_1, H_2, \ldots, H_N$) attached to LAN 16. Each header station has a domain of control. That is, all users within the domain of $H_1$ gain access to the LAN 16 only through $H_1$. Each header station 12 maintains a table 28a of mobile unit 10 identifiers and relevant user attributes. Table 28a contains identities of all mobile units 10 for which the header station 12 is responsible. For the case where a user moves from the cell of $H_1$ to the cell of $H_2$ control of the migrating mobile unit 10 must be passed from $H_1$ to $H_2$.

A cell corresponding to a header station H consists of the geographic area within which a mobile unit 10 can communicate with the header station. For the purpose of description of the protocols the following terminology is defined. The owner of mobile unit (A), denoted as Owner(A), is the header station 12 that is responsible for managing the communication needs of mobile unit A. The domain of a Header Station H, denoted as Domain(H), includes all the mobile units 10 that have H as their owner; the owner being solely responsible for the communication needs of owned mobile unit. The identities of these owned mobile units are maintained within Table 28a, as described. Thus, the following relationship can be expressed:

$$Domain(H) = \{A \mid Owner(A) = H\}.$$

As was previously shown the cells 42 may overlap. It should also be realized that, depending upon the physical placement of header stations, some overlap regions may be serviced by three or more header stations. Thus, a given mobile unit 10 may be able to communicate over the wireless link with two, three or more of the header stations 12. However, there can be, by definition, only one logical owner of a mobile unit 10 at any given time.

As an example, a network includes multiple header stations 12 and mobile units 10. Let $HS_1$ and $HS_2$ be two header stations 12. Let (A,B,C,D,E) be a set of five mobile units 10. Mobile units A, B and C are within a cell corresponding to header station $H_1$. Mobile units B,C,D and E are within a cell corresponding to header station $H_2$. Thus, mobile units B and C are within a region of overlap between the cell associated with $HS_1$ and the cell associated with $HS_2$. Mobile units A, D and E have unique choices for their owner while mobile units B and C each have two choices for their owner.

What follows now is a detailed description of a presently preferred method for achieving distributed control mechanisms for automatic domain and ownership relationships for the mobile units 10 as they freely migrate between overlapping transmission cells. The distributed control method of the invention results in an effective use of the wireless medium for the implementation shown in FIG. 3, where the header stations 12 have overlapping coverage areas and wherein a particular one or ones of the mobile units 10 may be within an overlapping region between the communication cells 42.

Protocols associated with the mobile units 1? are described first.

Figure 3:
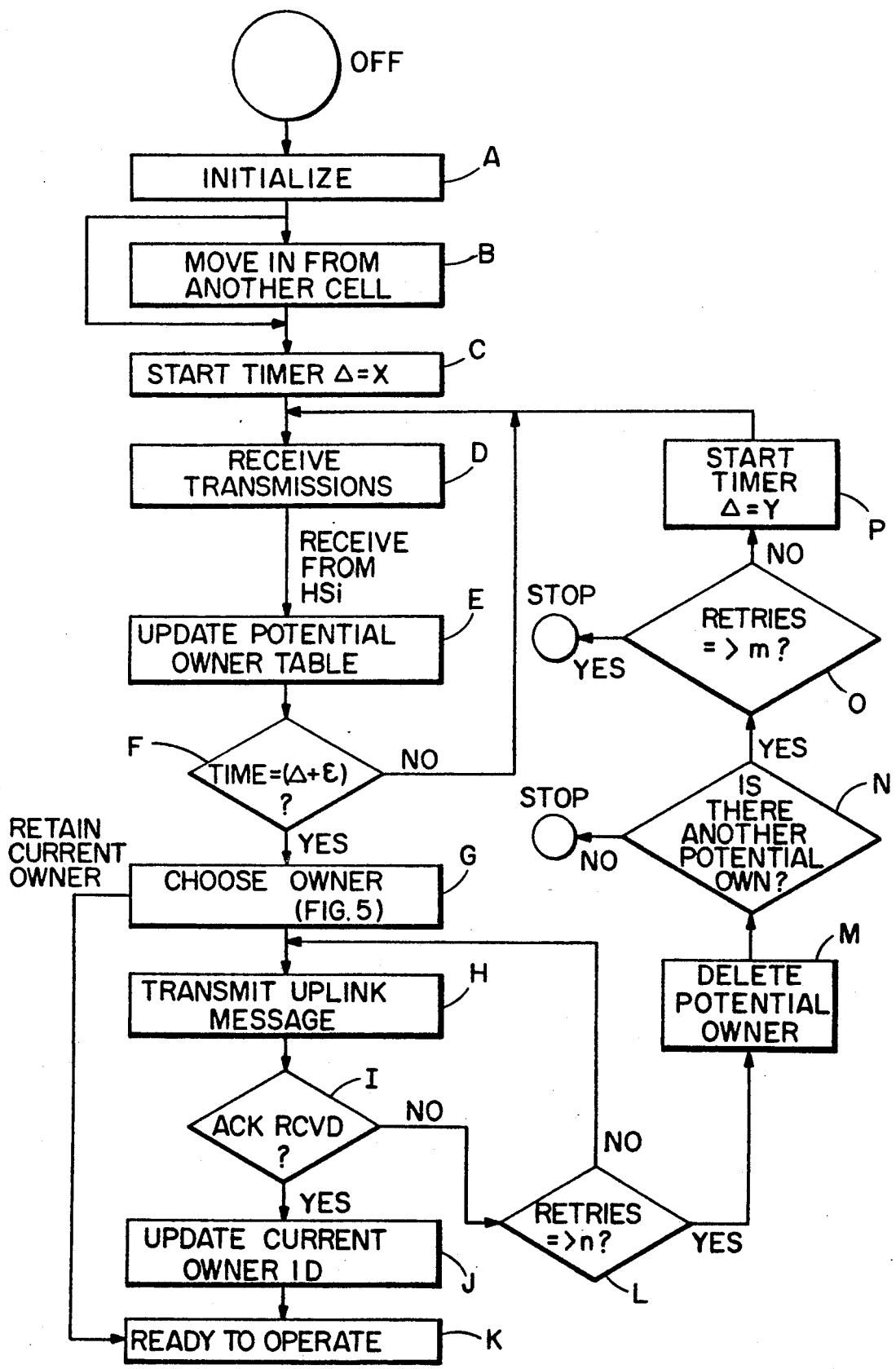
FIG. 3 is a flow chart illustrating a method performed by a mobile unit in selecting a new header station having a domain to which the mobile unit is to become associated.

Referring first to FIG. 3 there is illustrated a flowchart describing mobility protocols executed by a mobile unit 10. A given mobile unit 10 (mobile unit N) receives broadcast messages from all header stations 12 that are the potential owners of mobile unit N. The header stations 12 transmit broadcast messages periodically at time intervals uniformly distributed between ($\Delta - \epsilon$ and $\Delta + \epsilon$), where delta is some number of seconds, typically within the range of one to ten, and wherein epsilon is a variable having a value that varies within a range of approximately zero to 50 milliseconds. As a result, a mobile unit 10 will determine all header stations 12 that are potential owners within approximately ($\Delta + \epsilon$) seconds. The mobile unit 10 is required to determine the identity of potential owners whenever one of the following conditions is true:

(a) the mobile unit is turned on for the first time (Block A), or (b) the mobile unit crosses from one cell into another cell (Block B).

The mobile unit 10 initiates an internal timer (Block C) with a value of delta equal to (x) and monitors the wireless link for received messages (Block D). In that received messages originate from header stations 12 having cells that overlap the present position of the mobile unit 10 the mobile unit 10 maintains in memory 38 a list 38a of header stations 12 that can potentially own the mobile unit. On receiving a broadcast message of the form shown in FIG. 4a from a Header Station $H_i$, the mobile unit 10 augments the list to include $H_i$ (Block E).

Figure 4A:
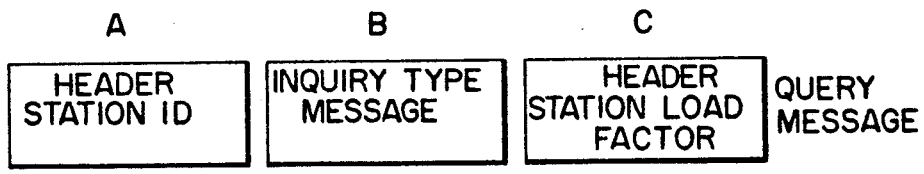
FIG. 4a shows the format of an inquiry message that is periodically transmitted from a header station to all mobile units within the communication cell of the header station.

As can be seen in FIG. 4a the downlink message received from the header stations 12 includes a field (A) expressive of a unique header station identification (ID), a field (B) expressive of an inquiry message type and a field (C) expressive of a load factor for the header station. The load factor is the number of mobile units 10 that the header station currently owns, that is, the Domain of the header station (Domain(H)). The downlink message is repeated by each header station at random time intervals in order to reduce the probability of collisions, as will be described.

Figure 4B:
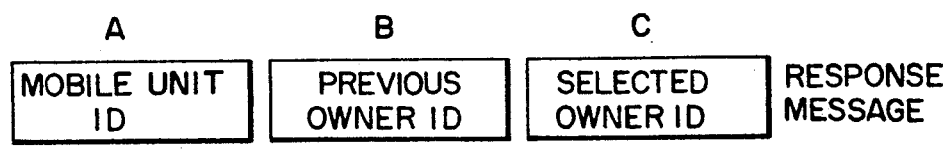

The mobile unit 10 continues to augment the list 38a of potential owners but does not transmit a reply message on the uplink communication channel. As such, battery power is conserved. After a period of time within which the mobile unit 10 has had sufficient time to have received the message of FIG. 4a from all potential owners (Block F), it executes a procedure Choose—Owner (Block G), described in relation to FIG. 5, and determines which of the potential owner header stations 12 should be the next owner. After determining the identity of the new owner the mobile unit 10 transmits an uplink message (Block H) that contains, as seen in FIG. 4b, the following information: Mobile—Unit—ID (Field (A)), Previous—Header—Station—ID (Field (B)) and New—Header—Station ID (Field (C)). The mobile unit 10 then waits for the selected new header station 12 to send a positive acknowledgement (ACK) confirming that it has accepted ownership of the mobile unit 10 (Block I).

If the execution of the Choose—Owner routine of FIG. 3 (Block G) results in the current owner being retained control transfers to Block K and no uplink message is required to be transmitted.

If no positive acknowledgement (ACK) is received within a predetermined time-out period the mobile unit 10 resends the uplink message (Block H). If for any reason the procedure fails after (n) repeated attempts, where the value of (n) is empirically determined as a function of the wireless link physical environment, the presence of noise sources, etc., the procedure Choose—Owner (Block G) is again repeated.

In greater detail, this entails a determination at (Block L) if the number of retries equals or exceeds a predetermined value (n). If yes, the mobile unit 10 deletes the non-responding header station 12 from the list of potential owners (Block M). At Block N a determination is made if any other potential owners exist in the list of potential owners. If no, the mobile unit 10 suspends the attempt to establish contact, thereby conserving battery power. If another potential owner exists a further determination is made if some number (m) of attempts to associate with a new owner has been exceeded (Block O). If desired, (m) can be set to infinity or to some large number. If yes, the mobile unit suspends the attempt to establish contact. If no, the timer is re-initialized with delta equal to (y), where (y) is generally less than ((x) of Block C. The mobile unit then reenters Block D in order to augment, if possible, the list of new owners; it being realized that during the procedure illustrated in FIG. 3 that the mobile unit may be in motion.

Assuming at (Block I) that the mobile unit 10 receives a positive ACK from selected new header station it updates the value of Current—Owner—ID (Block J). After this step, the mobile unit 10 is ready to transmit data to or receive data from the LAN (Block K).

The Choose—Owner procedure (Block G) is now described in relation to the flowchart of FIG. 5.

After mobile unit N receives the message of FIG. 4a from all potential owners, the mobile unit autonomously chooses one of the potential owners to be the new owner. As was stated, the mobile unit 10 should receive the message of FIG. 4a from all potential owners within a time interval of approximately $(\Delta + \epsilon)$ seconds.

The mobile unit 10 may occasionally simultaneously receive broadcast messages from more than one header station 12, resulting in a collision at the mobile unit 10 receiver. If a collision occurs the mobile unit 10 waits an additional reception period $(\Delta + \epsilon)$ in order to receive an additional cycle of broadcast messages from the header stations. In that the header stations 12 broadcast at random time intervals the probability of two successive collisions occurring is substantially reduced.

There is now described the criteria employed by the mobile unit 10 during the decision process of selecting which header station 12 is to newly own or to continue to own the mobile unit.

A first criteria seeks to accomplish a non-disruptive switching of ownership of mobile units 10 in order to minimize the use of control messages flowing between header stations 12 over the LAN 16. A second criteria relates to a strength of received signals at the mobile unit 10 and a third criteria relates to load balancing of header stations.

Referring to Block A of FIG. 5, if the current owner of the mobile unit 10 is also a potential owner of the mobile unit 10 (i.e., the mobile unit 10 has not moved outside of the cell 42 of the current owner) and the signal strength of the current owner is acceptable, then the current owner is retained (Block B). This has the beneficial effect of not requiring a change of the entries within table 28a as to which mobile units comprise the domain of the current owner. As such, no control messages need be sent over LAN 16 to change ownership information, and the first criteria expressed above is satisfied. If the current owner is retained no message is sent from the mobile unit 10 to the header station 12.

If the current owner is no longer a potential owner then control passes to Block C. In that different header stations 12 may own different numbers of mobile units 10 at various points in time, and in accordance with the third criteria expressed above, the mobile unit 10 makes a determination of the loading of the various potential owners. If the potential owners are not equally loaded the mobile unit 10 chooses at Block D the Header Station $H_i$ with the smallest load factor (Load Factor $(H_i)$ = number of mobile units 10 currently owned by $H_i$). The load factor, it should be remembered, forms part of the broadcast message from the header stations 12 (FIG. 4a, field C).

If at Block C the mobile unit 10 determines that all potential owners are equally loaded control passes to Block E. If the signal strength from Header Station $H_i$ is determined to dominate the signal strength from any other header station that is also a potential owner (Block E), then $H_i$ is chosen as the new owner (Block F). Otherwise, the mobile unit 10 randomly choose one of the potential owners as the new owner (Block G). As an example, one signal is considered to dominate another if it exceeds the signal strength of the other by at least a factor of 10. However, this criteria may be best determined empirically for a given application.

There is now described, in relation to the flowchart of FIG. 6, the operation of the header stations 12 in managing the member(s) of their respective domains.

At Block (A) the header station 12 is in a normal operating state wherein it manages message traffic between mobile units and the LAN 16. Periodically the header station 12 broadcasts the inquiry message of FIG. 4a to determine the presence or absence of mobile units 10 within the associated cell (Block B). The broadcast query is sent on average once every $\Delta$ seconds. The actual interval of time between successive query messages is uniformly distributed between $(\Delta - \epsilon)$ and $(\Delta + \epsilon)$ seconds. The purpose of the query message of FIG. 4a is to elicit responses from mobile units 10 located within the cell. Whether or not a response is returned to the header station by a mobile unit 10 depends on the autonomous operation of the receiving mobile units in determining their respective ownership (FIGS. 3 and 5).

Upon the reception of a response message from a mobile unit 10, having the form depicted in FIG. 4b, the header station first determines (Block C) if the message is addressed to it. That is, the header station determines if the Current—Owner—ID field (FIG. 4b, field C) matches an internally maintained unique header station ID. If the IDs do not match the header station 12 ignores the message and returns to the normal state (Block A). However, if the IDs do match the header station 12 creates an entry in its table 28a (Block D), thereby adding the requesting mobile unit to its domain. Next the header station determines if the mobile unit 10 has crossed a boundary from one cell to another (Block E). This is accomplished by determining if the Previous—Owner—ID field (FIG. 4b, field B) of the response message is not null. If the mobile unit 10 had been just turned ON, then the Previous—Owner—ID field will be null, that is empty or initialized to a value not corresponding to a valid header station ID. The ACK message is then sent to the mobile unit 10 (Block F) informing the mobile unit that the mobile unit has been added, as requested, to the domain of the header station.

If the mobile unit 10 is determined to have crossed over from another cell, that is, the mobile unit 10 had been under the control of another header station but has subsequently chosen to join the domain of the new header station, then the header station 12 sends a message over the LAN 16 to the previous owner (Block G). This message instructs the previous owner to disown the identified mobile unit and send any status information associated with the identified mobile unit. The transmitting header station then waits for a positive ACK and mobile unit status information to arrive from the previous owner (Block H). The previous owner disowns the mobile unit 10 by deleting the mobile unit's ID from the table 28a, thereby removing the mobile unit from the set of mobile units in the previous header station's domain.

The status includes information relating to any packets of data that have been received by the old header station but not yet transmitted to the mobile unit. As a part of this status information there is also provided routing information.

Figure 7:
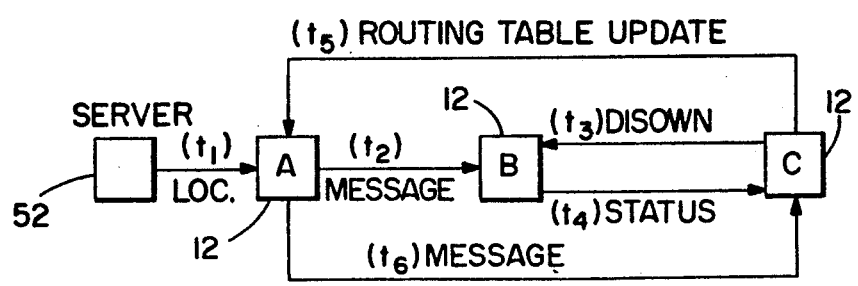
FIG. 7 diagrammatically shows an interaction between three header stations caused by the migration of a mobile unit from the domain of one of the header stations to the domain of another of the header stations.

As seen in FIG. 1b the header station 12 maintains a routing table 28b and a routing status table 28c. Referring also to FIG. 7 the routing table 28b is established when a first mobile unit 10 intends to transmit, for the first time, a message or data to a second mobile unit 10. For this case a header station (A) that owns the first mobile unit makes an inquiry to the LAN server 52 at time $(t_1)$ to determine a location of the second mobile unit, that is, the ID of the header station (B) that owns the second mobile unit. After receiving this information from the server 52 the header station (A) addresses the destination header station (B) and subsequently transmits across the LAN 16 at time $(t_2)$ the message or data for the second mobile unit. The routing table 28b of header station (A) preserves the ID of the destination header station (B) in case of subsequent transmissions from the first mobile unit to the second mobile unit. Upon receipt of the message header station (B) records in its table 28c the ID of the header station (A) that transmitted the message to the second mobile unit.

Assuming now that at some future time the second mobile unit migrates to the domain of a third header station (C), header station (C) sends at time ($t_3$) the Disown message (Block G of FIG. 6) to header station (B). In response to the Disown message header station (B) returns, at time ($t_4$) information relating to the second mobile unit. This information includes all pertinent information for this mobile unit that is contained within the Tables 28b and 28c. As a result, header station (C) becomes aware of the previous message sent from header station (A) to header station (B) for this mobile unit. The routing and status information is incorporated into those portions of the Tables 28b and 28c of header station (C) that relate to this particular mobile unit. At time ($t_5$) the header station (C) sends a routing table update message (Block I of FIG. 6) to header station (A) informing header station (A) that header station (C) is the new owner of the second mobile unit. The LAN server 52 is also informed of the change of ownership. In response to the routing table update message header station (A) updates its routing Table 28b to indicate that header station (C) is the new owner of the second mobile unit. Thereafter, if the first mobile unit associated with header station (A) directs another message at time ($t_6$), header station (A) accesses the routing Table 28b and directs the message to header station (C).

Returning to FIG. 6, after receiving the ACK and status information control passes to Block I, wherein each header station 12 that has a routing table 28b entry containing the mobile unit 10 is explicitly requested, via the LAN 16, to take note of the new owner of the mobile unit 10. After a positive ACK is received from each of the relevant header stations that routing table changes have been accomplished, the new owner sends the message to the mobile unit 10 informing the mobile unit that it has been successfully added to the domain of the header station (Block F). The header station 12 then returns to the normal state (Block A) where it performs functions other than managing mobility related protocols.

While the method of the invention has been described in the context of an IR wireless network it should be realized that this teaching is equally applicable to wireless networks using RF and other transmission mediums. Furthermore, variations in the physical embodiments of the header stations and mobile units may also be made without departing from the method of the invention. As such, while the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. A method for managing ownership of one or more mobile communication units in a wireless communications network, the wireless communications network having a plurality of header stations in bidirectional wireless communication over the wireless communications network with one or more of the mobile communication units, the method comprising the steps of:

periodically transmitting a first message over the wireless communications network from each of the plurality of header stations, the transmitted first message including information for uniquely identifying the transmitting header station and also including information for specifying a number of mobile communication units for which the transmitting header station is presently managing wireless communications;

receiving, with a mobile communication unit located at a position that is served by two or more of the header stations, the transmitted first message from each of the header stations that serve the position occupied by the mobile communication unit, the transmitted first messages being received over the wireless communications network;

selecting, with the mobile communication unit in accordance with the received transmitted first messages from the two or more header station as, one of the header stations as a header station to manage future wireless communications for the mobile communication unit; and if the selected header station is not a header station that is presently managing wireless communications for the mobile communication unit, transmitting a second message over the wireless communications network from the mobile communication unit to the selected header station, the transmitted second message requesting that wireless communications for the mobile communication unit be managed by the selected header station.

2. A method as set forth in claim 1 wherein the step of selecting includes the following steps:

determining if the received transmitted first message originated from a header station that is presently managing wireless communications for the mobile communication unit; and, if so determining if a strength of the received transmitted first message is above a predetermined threshold; and, if so retaining the header station that is presently managing wireless communications for the mobile communication unit.

3. A method as set forth in claim 2 wherein if the header station that is presently managing wireless communications for the mobile communication unit is not retained, the step of selecting further includes the steps of:

determining from the received transmitted first messages the number of other mobile communication units that are currently managed by each of the header stations that serve the position occupied by the mobile communication unit; and selecting a header station that is managing wireless communications for the fewest number of other mobile units; or if all of the header stations that serve the position occupied by the mobile communication unit are determined to be managing a same number of other mobile communication units, selecting the header station having a received signal strength that exceeds the received signal strengths of the other header stations by a predetermined amount; or if none of the header stations that serve the position occupied by the mobile communication unit are determined to have a received signal strength that exceeds that of the other header stations by the predetermined amount, selecting one of the header stations at random.

4. A method as set forth in claim 1 and further comprising the steps of:

receiving at the selected header station the second message transmitted by the mobile communication unit; and notifying the mobile communication unit that the selected header station has accepted the mobile communication unit for inclusion within a set of mobile communication units for which the selected header station is managing wireless communications.

5. A method as set forth in claim 1, wherein the second message includes information for identifying a header station, if any, that is currently managing wireless communications for the mobile communication unit, and further comprising the steps of:

receiving at the selected header station the second message transmitted by the mobile communication unit;

determining, with the selected header station, if wireless communications for the mobile communication unit was previously managed by another header station; and, if so, informing the other header station, from the selected header station, that the mobile communication unit is now managed by the selected header station.

6. A method as set forth in claim 5 and further comprising a step of notifying, with the selected header station, all other header stations that maintain a communications routing table that includes the mobile communication unit, that the mobile communication unit is now managed by the selected header station.

7. A method as set forth in claim 1 wherein the step of receiving occurs for a period of time determined to be sufficiently long so as to receive at least one transmitted first message from each of the header stations that serve the position occupied by the mobile communication unit.

8. A method as set forth in claim 1 wherein the step of receiving occurs for a period of time at least equal to $(\Delta + \epsilon)$, where delta is a predetermined time interval and wherein epsilon is a variable time period, the period of time being sufficiently long so as to receive at least one transmitted first message from each of the header stations that serve the position occupied by the mobile communication unit.

9. A method as set forth in claim 1 wherein the step of transmitting the second message includes a step of transmitting a message including at least an identification of the mobile communication unit, an identification of a header station, if any, having a domain of which the mobile communication unit is currently a member, and an identification of the selected header station.

10. A method as set forth in claim 6 wherein the steps of informing and notifying each include a step of transmitting a message over a wired network that is coupled between the header station and others of the header stations.

11. A method as set forth in claim 1 wherein each of the header stations is bidirectionally coupled to a wired network, and wherein the selected header station records an identification of the second header station in response to a receipt of a message from the wired network that is directed to the mobile communication unit from a second header station.

12. A method as set forth in claim 11 wherein the selected header station, in response to a receipt of a message from the wired network from a third header station, the received message from the third header station indicating that the mobile communication unit has selected the third header station to manage wireless communications for the mobile communication unit, transmits a message over the wired network to the third header station, the message that is transmitted to the third header station including the identification of the second header station.

13. A method as set forth in claim 12 wherein the third header station, upon receipt of the message from the previously selected header station, transmits a message over the wired network to the second header station to inform the second header station that the third header station is managing wireless communications for the mobile communication unit.

14. A method as set forth in claim 13 wherein the second header station updates an internally maintained routing table in response to a receipt of the message from the third header station such that a subsequent message that is directed to the mobile communication unit is transmitted over the wired network from the second header station to the third header station.

15. A method as set forth in claim 12 wherein the third header station updates an internally maintained status table in response to a receipt of the message from the previously selected header station such that the third header station is enabled to determine what other header stations, if any, have previously directed a message to the mobile communication unit.

16. A wireless communications system having a plurality of header stations each serving a communication coverage area, the system further including at least one mobile communication unit, the mobile communication unit comprising:

means for receiving, when located at a position that is served by two or more of the header stations, a transmission from each of the header stations that serve the position occupied by the mobile communication unit, the received transmissions being received over the wireless communications network and each transmission including information for uniquely identifying the transmitting header station, each transmission further including other information for indicating a number of mobile communication units for which the transmitting header station is currently managing wireless communications;

means for selecting, in accordance with the received transmissions from the two or more header stations, one of the header stations as a header station to manage future wireless communications for the mobile communication unit; and means for transmitting a message over the wireless communications network from the mobile communication unit to the selected header station, the transmitted message requesting that the mobile communication unit be assigned to the selected header station, said transmitting means operating in response to a determination by the mobile communication unit that the selected header station is not a header station that is presently managing wireless communications for the mobile communication unit, the transmitted message including information for identifying a header station, if any, that is currently managing wireless communications for the mobile communication unit.

17. A wireless communications system as set froth in claim 16 and further including a wired network for coupling together the plurality of header stations such that the header stations are enabled to communicate messages one to another, one type of message being transmitted over the wired network from the selected header station to a previously selected header station to inform the previously selected header station that the selected header station is now managing wireless communications for the mobile communication unit.

18. A wireless communications system as set forth in claim 16 wherein each of the header stations and the mobile communication unit include means for transmitting an infrared radiation signal to the wireless communications network and means for receiving an infrared radiation signal from the wireless communications network.

19. A wireless communications system as set forth in claim 16 wherein the mobile communication unit further includes:
means for storing a list of header stations that are determined by the mobile communication unit to be potential owners of the mobile communication unit; and
means for updating the list in response to the received transmissions;
and wherein each of the header stations includes means for storing a communications routing table associated with one or more mobile communication units that are owned by the header station.

20. A method for managing ownership of one or more mobile communication units in a wireless communications network, the wireless communications network having a plurality of header stations in bidirectional wireless communication with one or more of the mobile communication units, the method comprising the steps of:
receiving, with a mobile communication unit located at a position that is served by two or more of the header stations, a transmission from each of the header stations that serve the position occupied by the mobile communication unit, the received transmissions being received over the wireless communications network, each transmission uniquely identifying the transmitting header station;
selecting, with the mobile communication unit and in accordance with the received transmissions from the two or more header stations, one of the header stations as a header station to manage future wireless communications for the mobile communication unit; and
if the selected header station is not a header station that is presently managing wireless communications for the mobile communication unit, transmitting a message over the wireless communications network from the mobile communication unit to the selected header station requesting that the selected header station manage future wireless communications for the mobile communication unit;
wherein the selected header station, in response to a message directed to the mobile communication unit from a second header station, records an identification of the second header station; and wherein
the selected header station, in response to a message from a third header station that indicates that the mobile communication unit has selected the third header station to manage wireless communications for the mobile communication unit, transmits a message to a a third header station, the message including the identification of the second header station.

21. A wireless data communications system, comprising:
a plurality of header stations, each of said header stations including means for transmitting information to a wireless network and means for receiving information for the wireless network, each of said header stations having a wireless communication cell associated therewith, each of said header stations further including means for bidirectionally coupling the header station to a wired network for transmitting information to the wired network and for receiving information from the wired network, wherein at least some of the information that is transmitted to the wired network is information that is first received from the wireless network, and wherein at least some of the information that is transmitted to the wireless network is information that is first received from the wired network; and
at least one mobile data station, said mobile data station including,
means for receiving, when located at a position where two or more wireless communications cells overlap, a transmission from each of the header stations associated with the overlapping wireless communications cells, each of the transmissions including information for uniquely identifying the transmitting header station, each transmission further including other information for indicating a number of mobile data stations for which the transmitting header station is currently managing wireless data communications;
means for selecting, in accordance with the received transmissions from the two or more header stations, one of the header stations as a header station to manage future wireless communications for the mobile data station; and
means for transmitting a message over the wireless communications network from the mobile data station, the transmitted message including information for uniquely identifying the mobile data station, information for specifying an identification of a header station, if any, that is currently managing wireless communications for the mobile data station, and information for specifying the identification of the selected header station, said transmitting means operating in response to a determination by the mobile communication unit that the selected header station is not a header station that is presently managing wireless communications for the mobile communication unit.

22. A wireless data communications system as set forth in claim 21 wherein each of the header stations and the mobile data station include means for transmitting an infrared radiation signal to the wireless communications network and means for receiving an infrared radiation signal for the wireless communications network.

23. A wireless data communications system as set forth in claim 21 wherein the mobile data station includes means for storing a list of header stations that are determined by the mobile data station to be potential owners of the mobile data station, and wherein each of the header stations includes means for storing a communications routing table having entries for at least each of the mobile data stations for which the header station is currently managing wireless data communications.

* * * * *